US010462170B1

(12) United States Patent
Wang et al.

(10) Patent No.: US 10,462,170 B1
(45) Date of Patent: Oct. 29, 2019

(54) SYSTEMS AND METHODS FOR LOG AND SNORT SYNCHRONIZED THREAT DETECTION

(71) Applicant: Alert Logic, Inc., Houston, TX (US)

(72) Inventors: Dagen Wang, Houston, TX (US); Ian Rickey, Houston, TX (US)

(73) Assignee: Alert Logic, Inc., Houston, TX (US)

( * ) Notice: Subject to any disclaimer, the term of this patent is extended or adjusted under 35 U.S.C. 154(b) by 234 days.

(21) Appl. No.: 15/819,376

(22) Filed: Nov. 21, 2017

Related U.S. Application Data

(60) Provisional application No. 62/424,865, filed on Nov. 21, 2016.

(51) Int. Cl.
| | |
|---|---|
| *G06N 20/00* | (2019.01) |
| *H04L 29/06* | (2006.01) |
| *G06F 16/2458* | (2019.01) |
| *G06N 5/02* | (2006.01) |
| *G06F 21/55* | (2013.01) |

(52) U.S. Cl.
CPC ...... *H04L 63/1425* (2013.01); *G06F 16/2465* (2019.01); *G06N 5/025* (2013.01); *H04L 63/1416* (2013.01); *G06F 21/552* (2013.01); *G06N 20/00* (2019.01)

(58) Field of Classification Search
CPC . H04L 63/1425; H04L 63/1416; G06N 5/025; G06N 20/00; G06F 16/2465; G06F 21/552
See application file for complete search history.

(56) References Cited

U.S. PATENT DOCUMENTS

| | | | |
|---|---|---|---|
| 6,421,667 B1 * | 7/2002 | Codd | G06F 9/44 |
| 8,401,982 B1 * | 3/2013 | Satish | G06N 20/00 |
| | | | 706/20 |
| 8,510,467 B2 * | 8/2013 | Legrand | H04L 63/1408 |
| | | | 709/201 |

(Continued)

FOREIGN PATENT DOCUMENTS

WO WO-2005114541 A2 * 12/2005 ........... G06F 21/552

OTHER PUBLICATIONS

Tim Zwietasch, "Detecting anomalies in system log files using machine learning techniques", 2014, Erscheinungsdatum: Bachelor's thesis.*

(Continued)

*Primary Examiner* — Lisa C Lewis
*Assistant Examiner* — Zhimei Zhu
(74) *Attorney, Agent, or Firm* — Intrinsic Law Corp.

(57) ABSTRACT

This disclosure provides a new automated threat detection using synchronized log and Snort streams. Time segments from a log stream are correlated by time to time segments from a Snort stream that have been identified as indicating "true" incidents. To determine whether a correlated time segment is "good" or "bad," features are extracted from the correlated time segment and used to determine tuples associated therewith, each tuple containing a message type, a location, and an out of vocabulary word in the correlated time segment. A multidimensional feature vector containing a select number of the tuples is generated and provided as input to a machine learning module which determines, based on machine intelligence, whether the correlated time segment indicates a true incident.

21 Claims, 3 Drawing Sheets

(56) References Cited

U.S. PATENT DOCUMENTS

| | | | |
|---|---|---|---|
| 8,682,812 B1* | 3/2014 | Ranjan | H04L 63/1425 706/12 |
| 8,904,531 B1* | 12/2014 | Saklikar | G06F 21/552 707/695 |
| 9,292,707 B1* | 3/2016 | Fontecchio | H04L 63/0876 |
| 9,385,993 B1* | 7/2016 | Kulp | H04L 63/1425 |
| 9,516,053 B1* | 12/2016 | Muddu | G06F 16/254 |
| 9,690,933 B1* | 6/2017 | Singh | G06F 21/56 |
| 10,007,786 B1* | 6/2018 | Bhatkar | G06F 21/566 |
| 10,009,358 B1* | 6/2018 | Xie | G06F 21/316 |
| 10,019,338 B1* | 7/2018 | Goradia | G06F 11/3608 |
| 10,133,614 B2* | 11/2018 | Mankovskii | H04L 41/069 |
| 2003/0110396 A1* | 6/2003 | Lewis | H04L 63/0227 726/4 |
| 2003/0188189 A1* | 10/2003 | Desai | H04L 63/104 726/23 |
| 2004/0250169 A1* | 12/2004 | Takemori | H04L 63/1425 714/38.1 |
| 2007/0038889 A1* | 2/2007 | Wiggins | G05B 23/0264 714/20 |
| 2009/0164522 A1* | 6/2009 | Fahey | H04L 63/1441 |
| 2009/0167520 A1* | 7/2009 | Watanabe | H04L 41/064 340/507 |
| 2009/0292743 A1* | 11/2009 | Bigus | G06F 21/316 |
| 2009/0293121 A1* | 11/2009 | Bigus | G06F 21/316 726/22 |
| 2010/0212013 A1* | 8/2010 | Kim | H04L 45/00 726/23 |
| 2011/0247071 A1* | 10/2011 | Hooks | G06F 21/567 726/24 |
| 2011/0270957 A1* | 11/2011 | Phan | H04L 41/0622 709/221 |
| 2011/0277034 A1* | 11/2011 | Hanson | G06F 21/554 726/25 |
| 2012/0072782 A1* | 3/2012 | Hughes | H04L 12/6418 714/57 |
| 2012/0137342 A1* | 5/2012 | Hartrell | G06F 21/552 726/1 |
| 2012/0191660 A1* | 7/2012 | Hoog | G06F 21/552 707/661 |
| 2012/0233311 A1* | 9/2012 | Parker | H04L 43/00 709/224 |
| 2013/0055399 A1* | 2/2013 | Zaitsev | H04L 63/0263 726/25 |
| 2013/0067575 A1* | 3/2013 | Zuk | H04L 63/1425 726/23 |
| 2013/0097706 A1* | 4/2013 | Titonis | G06F 21/56 726/24 |
| 2014/0007241 A1* | 1/2014 | Gula | H04L 63/1433 726/25 |
| 2014/0281760 A1* | 9/2014 | Yoshizawa | G06F 11/3065 714/57 |
| 2014/0283083 A1* | 9/2014 | Gula | H04L 63/1433 726/25 |
| 2014/0344622 A1* | 11/2014 | Huang | G06F 11/079 714/37 |
| 2015/0358344 A1* | 12/2015 | Mumcuoglu | G06F 21/552 726/23 |
| 2016/0104076 A1* | 4/2016 | Maheshwari | G06N 20/00 706/12 |
| 2016/0173446 A1* | 6/2016 | Nantel | H04L 63/1425 726/11 |
| 2016/0191918 A1* | 6/2016 | Lai | H04N 19/13 375/240.02 |
| 2016/0196173 A1* | 7/2016 | Arora | G06F 11/079 714/37 |
| 2016/0226895 A1* | 8/2016 | Huang | H04L 63/1416 |
| 2016/0277431 A1* | 9/2016 | Yu | H04L 63/1441 |
| 2016/0321906 A1* | 11/2016 | Whitney | G06F 3/0484 |
| 2017/0019487 A1* | 1/2017 | Maheshwari | H04L 67/16 |
| 2017/0068721 A1* | 3/2017 | Chafle | G06F 11/00 |
| 2017/0091008 A1* | 3/2017 | Cherbakov | G06F 11/079 |
| 2017/0146986 A1* | 5/2017 | Libal | G05B 19/0428 |
| 2017/0169360 A1* | 6/2017 | Veeramachaneni | G06F 21/56 |
| 2017/0171228 A1* | 6/2017 | McLean | H04L 63/1416 |
| 2017/0171240 A1* | 6/2017 | Arzi | G06F 21/566 |
| 2017/0178025 A1* | 6/2017 | Thomas | G06N 5/025 |
| 2017/0178026 A1* | 6/2017 | Thomas | G06F 21/552 |
| 2017/0180403 A1* | 6/2017 | Mehta | H04L 63/1416 |
| 2017/0230384 A1* | 8/2017 | Touboul | G06F 21/577 |
| 2017/0279840 A1* | 9/2017 | Zhang | H04L 63/1425 |
| 2017/0316343 A1* | 11/2017 | Shamsi | G06F 11/3476 |
| 2017/0331853 A1* | 11/2017 | Kawakita | H04L 63/1416 |
| 2018/0077175 A1* | 3/2018 | DiValentin | H04L 63/1416 |
| 2018/0077189 A1* | 3/2018 | Doppke | H04L 63/1433 |
| 2018/0089424 A1* | 3/2018 | Yang | G06F 21/552 |
| 2018/0129579 A1* | 5/2018 | Debnath | G06N 20/00 |
| 2018/0246797 A1* | 8/2018 | Modi | G06F 11/3438 |
| 2018/0248902 A1* | 8/2018 | D Nil -Dumitrescu | G06N 3/02 |
| 2019/0028557 A1* | 1/2019 | Modi | G06F 21/316 |
| 2019/0188381 A9* | 6/2019 | Zhao | G06N 3/0445 |

OTHER PUBLICATIONS

T. Kimura, A. Watanabe, T. Toyono and K. Ishibashi, "Proactive failure detection learning generation patterns of large-scale network logs," 2015, 11th International Conference on Network and Service Management (CNSM), Barcelona, 2015, pp. 8-14.*

Wei Xu, Ling Huang, Armando Fox, David Patterson, and Michael I. Jordan. "Detecting large-scale system problems by mining console logs". 2009. In Proceedings of the ACM SIGOPS 22nd symposium on Operating systems principles (SOSP '09). ACM, New York, NY, USA, pp. 117-132.*

* cited by examiner

SYSTEMS AND METHODS FOR LOG AND SNORT SYNCHRONIZED THREAT DETECTION

CROSS-REFERENCE TO RELATED APPLICATION(S)

This is a conversion of, and claims a benefit of priority from U.S. Provisional Application No. 62/424,865, filed Nov. 21, 2016, entitled "SYSTEMS AND METHODS FOR LOG AND SNORT SYNCHRONIZED THREAT DETECTION," the entire disclosure of which is incorporated by reference herein for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to network security. More particularly, embodiments disclosed herein relate to networked threat detection systems operating in a distributed computing environment. Even more particularly, embodiments disclosed herein related to systems, methods, and computer program products for log and snort synchronized threat detection.

BACKGROUND OF THE RELATED ART

In the field of network security, computerized tools are often used to prevent and monitor unauthorized access, misuse, modification, or denial of a computer network and network-accessible resources. A network intrusion detection system (NIDS) is an example of a computerized network security tool—which can be implemented as a networked device or software application—that monitors a network or systems for detecting malicious activity or policy violations. A network intrusion prevention system (NIPS) is another example of a computerized network security tool—which can be implemented as a networked device or software application—that aims to prevent such malicious activity or policy violations. These computerized network security tools are collectively referred to herein as network security systems.

Snort is an open source network security system that can, in different modes, read and display network packets on Internet Protocol (IP) networks (sniffing); log network packets (packet logging); and monitor and analyze network traffic (intrusion detection). Snort is known to those skilled in the network security art and thus is not further described herein for the sake of brevity.

In a network security system, log data is a massive unstructured data source that contains a lot of security information. However, log data is difficult to consume for the purpose of threat detection even for network security analysts due to the massive size in volume, the terse nature of security and application logging, and the difficulties humans face in recognizing those security issues and correlating them to intrusion detection system (IDS) event data. Consequently, there is room for innovations and improvement.

SUMMARY OF THE DISCLOSURE

Work on network security log data analysis so far has been focused on parsing the log data into structured format and deliver visual interpretation to help network security analysts to leverage their security insights. There are also some approaches to use log stream dynamics to detect anomaly which infers potential threats. However, none of these approaches provides direct correlation with threats.

An object of the invention is to address the aforementioned drawbacks and provide additional technical solutions and benefits. This object can be realized in systems, methods, and computer program products particularly configured for synchronizing and correlating log and IDS event streams, temporal patterns, contents, and analysis, to thereby allow for a complete view and understanding of successful cyberattacks external and internal to a computing environment. The log data described herein in most cases can be independently collected from Snort data.

In some embodiments, a Snort stream and a log stream are paired up by time mark information and threat tagging information is leveraged to programmatically and automatically tag log data, advantageously eliminating the need for human network security analysts to tag the log stream. This unique approach resolves the fundamental challenge in log threat detection and great results are achieved. This approach could also be applied to statistically leverage characteristic of a threat in log data. That is, by paring a Snort stream and a log stream by time mark information and utilizing threat tagging information to programmatically and automatically tag log data, threat correlated information can be automatically generated from the log data utilizing statistical methods.

By preparing data from log messages in a machine-oriented manner and training the machine to learn and identify true incidents, embodiments disclosed herein can accurately detect threats that otherwise might not be detectable by conventional Snort-based network security systems.

One embodiment comprises a system comprising at least one processor and at least one non-transitory computer-readable storage medium that stores computer instructions translatable by the at least one processor to perform a method substantially as described herein. Another embodiment comprises a computer program product having at least one non-transitory computer-readable storage medium that stores computer instructions translatable by at least one processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

A more complete understanding of the invention and the advantages thereof may be acquired by referring to the following description, taken in conjunction with the accompanying drawings in which like reference numbers indicate like features and wherein.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
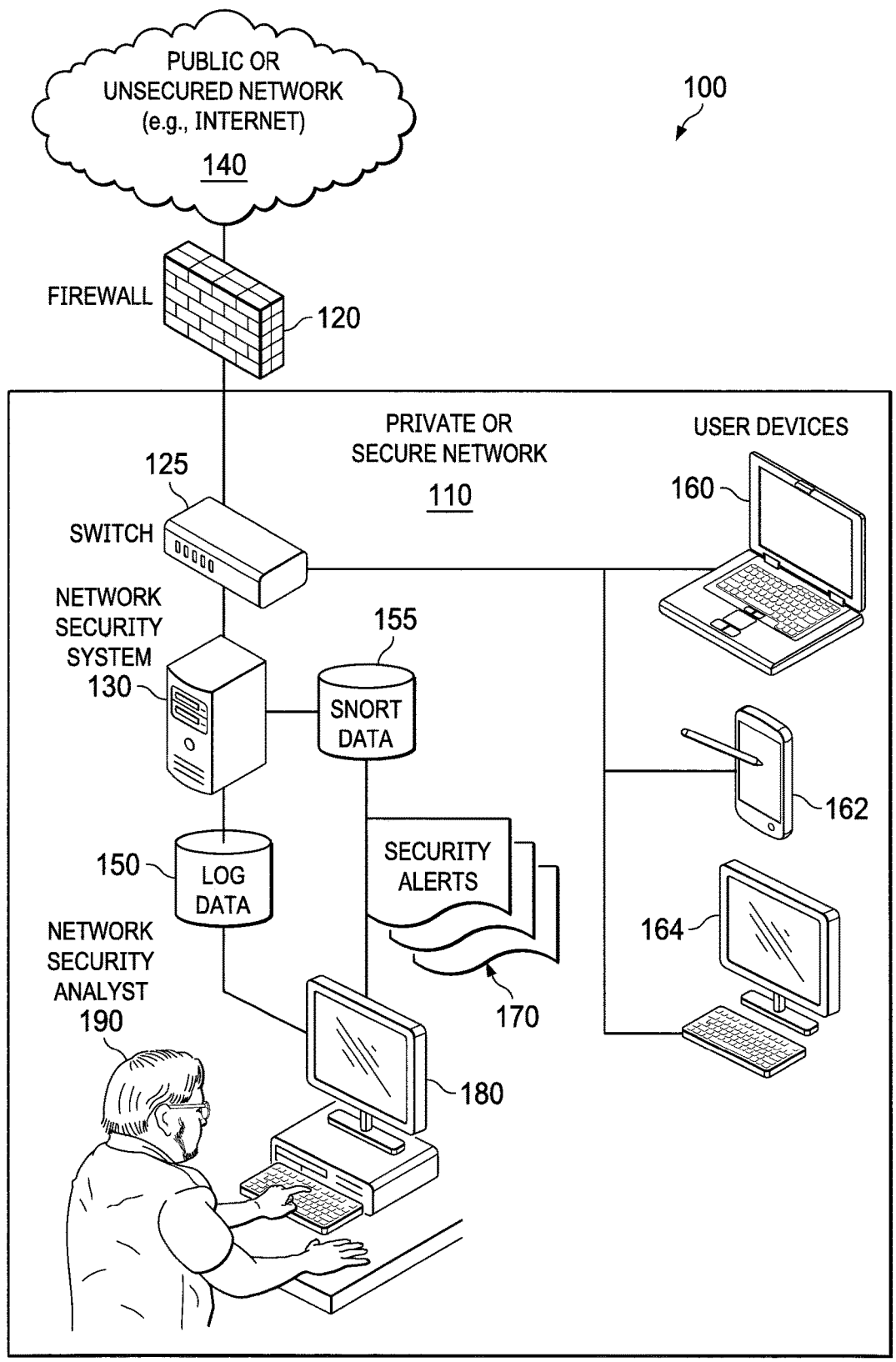
FIG. 1 depicts a diagrammatic representation of an example of a network security system operating in a network computing environment where embodiments disclosed here can be implemented.

FIG. 1 depicts a diagrammatic representation of one example of network security system 130 operating in private or secure network 110 that communicates with public or unsecured network (e.g., the Internet) 140 through firewall 120 in network computing environment 100. Network security system 130 may be communicatively connected to switch 125 behind firewall 120 to monitor network traffic to and from private network 110. As a non-limiting example, network security system 130 may be a Snort-based system as described above. Snort events in Snort data 155 can carry some security information/warnings (e.g., security alerts) 170. However, not all security alerts 170 may cause damage to assets 160 (e.g., server machine(s) 130, user devices 162, 164, 180, storage devices storing log data 150, Snort data 155, network device 125, software running on server machine(s) 130, and/or data 170) owned by an operator of private network 110. Accordingly, human network security analyst 190 may review security alerts 170, identify a true incident from the Snort events contained therein, and then escalate or report the true incident (e.g., to the operator of private network 110).

Figure 2:
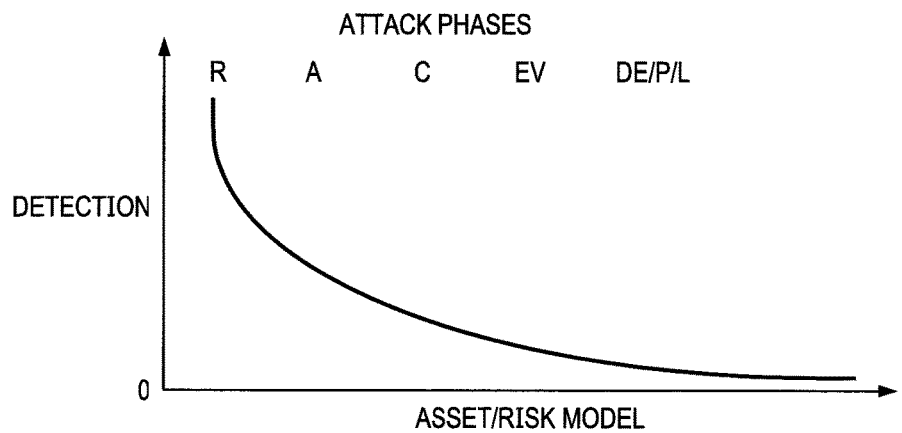
FIG. 2 depicts an asset/risk model showing the level of difficulty in detecting attack activities in different attack phases, according to some embodiments disclosed herein.

The Snort events may reflect various types of cyberattacks. FIG. 2 depicts an asset/risk model showing the level of difficulty in detecting attack activities in different cyberattack phases, according to some embodiments disclosed herein. As illustrated in FIG. 2, a computer network may face the following multiple attack phases:

R (Reconnaissance)—In this phase, an attacker may seek to identify weak points of a target computer network. Reconnaissance is probably the longest phase, sometimes lasting weeks or months. The activities in this phase are not easy to defend against, but they are relatively detectable.

A (Attack)—In this phase, an attacker may attack the detected weak points of a target computer network to find additional vulnerabilities. The activities in this phase are often, but not always, detectable.

C (Compromise)—In this phase, an attacker may seek to compromise and gain access to one or more network devices. The activities in this phase can be hard to detect.

EV (Exploit Vulnerabilities)—In this phase, an attacker may exploit vulnerabilities or weaknesses of a target computer network through network device(s) that have been compromised. The activities in this phase can be extremely difficult to detect as the attack has somehow successfully circumvented the security controls in place.

DE/P/L (Data Exfiltration/Persistence/Lateral Movement)—In this aggregate phase, an attacker has established persistence on an asset (e.g., a network device or file) in a target computer network and may extract information that is of value to the attacker and/or may use the persistence in the target computer network as a launch pad for attacks against other targets in and/or outside of the target computer network. The activities in this phase can be extremely difficult to detect.

As illustrated in the asset/risk model of FIG. 2, as the level of difficulty to detect activities in each attack phase increases, the level of detection drops significantly. The higher the value of an asset, the higher the risk of not being able to detect potentially damaging cyberattack activities.

Skilled artisans appreciate that, while Snort-based network security systems such as an intrusion detection system (IDS) can readily detect attacks in the R phase and some in the A phase, it is very difficult, if not frequently impossible, for conventional IDSs to detect cyberattack activities in the C, EV, and DE/P/L phases. This is at least because of the massive amounts of responses an IDS can possibly capture. For example, an IDS may capture one attack out of a quarter of a million attacks.

Additionally, there are many different ways that cyberattacks may be obfuscated. For example, network responses may go out through different ports than the one(s) to which an IDS is listening—an IDS may primarily focus on monitoring an HTTP/TCP port 80, while an attack may conduct data exfiltration via a reverse shell out of an SSL socket or doing a DNS spoofing to get around the port being monitored by the IDS. As another example, a human network security analyst may be trained to recognize a coded method of data exfiltration using a 16 byte Random Seed. However, an attacker may arbitrarily decide to use a 32 byte Random Seed or some other ways to steal data at any given time. There are numerous techniques that attackers may use to make themselves invisible to the IDSs and there are methods that human network security analysts cannot possibly immediately recognize.

Generally, cyberattacks may be categorized into multiple different classes. For example, according to the Open Web Application Security Project (OWASP), common types of application security attacks may include abuse of functionality, data structure attacks, embedded malicious code, exploitation of authentication, injection, path traversal attack, probabilistic techniques, protocol manipulation, resource depletion, resource manipulation, sniffing attacks, spoofing, etc. Each class may have many subclasses. For example, under injection, there can be many subclasses, including, but are not limited to, Blind SQL Injection, Blind XPath Injection, Code Injection, Command Injection, Content Spoofing, Cross-site Scripting, LDAP Injection, PHP Object Injection, Resource Injection, SQL Injection, Web Parameter Tampering, XPath Injection, and so on. Depending upon the context, these kinds of attacks may be specific to certain servers such as relational database management systems like MySQL servers, Microsoft SQL servers, Oracle database servers, etc. Due at least to the varieties, the ever-changing nature, and the number of possible attacks constantly bombarding networked computer systems at any given time, it is exponentially difficult, if it is not completely impossible, to write a signature for an IDS that captures all these different attacks.

Another challenge for network security providers is the general lack of visibility to network vulnerabilities, for instance, how to accurately and correctly identify all possible vulnerabilities in a networked computing environment; how to find out what compromises or exploited vulnerabilities may look like before or once attempted attacks have taken place; or how to look for compromises or exploited vulnerabilities in other data sources. Network security providers typically do not consider log messages as a data source for identifying possible attacks. One reason is because there can be a finite number of attacks, but almost an infinite number of ways that log messages can be produced. As a result, from the historical perspective of network security, there is very little, if any at all, correlation between IDS signatures and log events.

Accordingly, existing IDSs can be insufficient in detecting attacks in the C, EV, and DE/P/L phases (which, as discussed above, often correlate to more severe asset damages and/or security risks). To this end, what is needed is an ability to correlate between attack attempts and the log message verification of attacks in the C, EV, and DE/P/L phases through identification of abnormal behaviors or other methods. For example, a network device such as a laptop that reaches out to another user's system on a regular basis and establishes a socket-persistence between the two devices would be extremely and highly unusual—an indication of a possible attack moving from the C phase to possibly the lateral movement phase.

To correlate such persistence and lateral movement, a more complete security context to an incoming attack is needed. Since activities on a network can be collected in log messages, log data can provide the needed security context. However, to human network security analysts, this security context is lost or not possible to extrapolate. One reason is that log messages are unstructured. Moreover, networked computer systems may collect log messages for various reasons other than network security. For example, they may collect log messages for compliance reasons and no human review may be conducted on the collected log messages. Furthermore, log messages may have different time bases, data formats, data schemas, etc. and may be recorded asynchronously. Thus, it can be practically impossible for human network security analysts to try to differentiate, out of hundreds of millions of log messages between Internet Protocol (IP) or network addresses, activities that may reflect normal events being logged from activities that may be more malicious in nature, for instance, that may correlate to some kind of attack techniques. Unfortunately, because log messages are not considered as a data source for identifying possible attacks, no tools existing today that may indeed correlate collected (logged) events in log messages to provide the proper security context to IDS attacks identified by the IDSs.

Embodiments disclosed herein can sufficiently deconstruct the attack types, techniques, and methods and utilize the deconstructed information to algorithmically define the types of things to look for in log messages and correlate them to provide evidence that an attack happened to target certain assets in the C, EV, and/or DE/P/L phases. By definition, Snort events carry some security information/warning. However, they are not necessarily causing damage to network assets in a computer network. In a network security operation center, an analyst would decide, based on human intelligence, on the content of the security incident where a series of Snort events are presented. The "true" incident is thus identified and escalated to the entity that owns and/or operates the computer network. In some embodiments, events in a Snort stream that have been identified by human intelligence as "true" incidents can be leveraged as the gold standard to facilitate automated log-based threat detection. The gold standard can help in building a training data set where machine learning algorithm(s) could be applied for this task.

Figure 3:
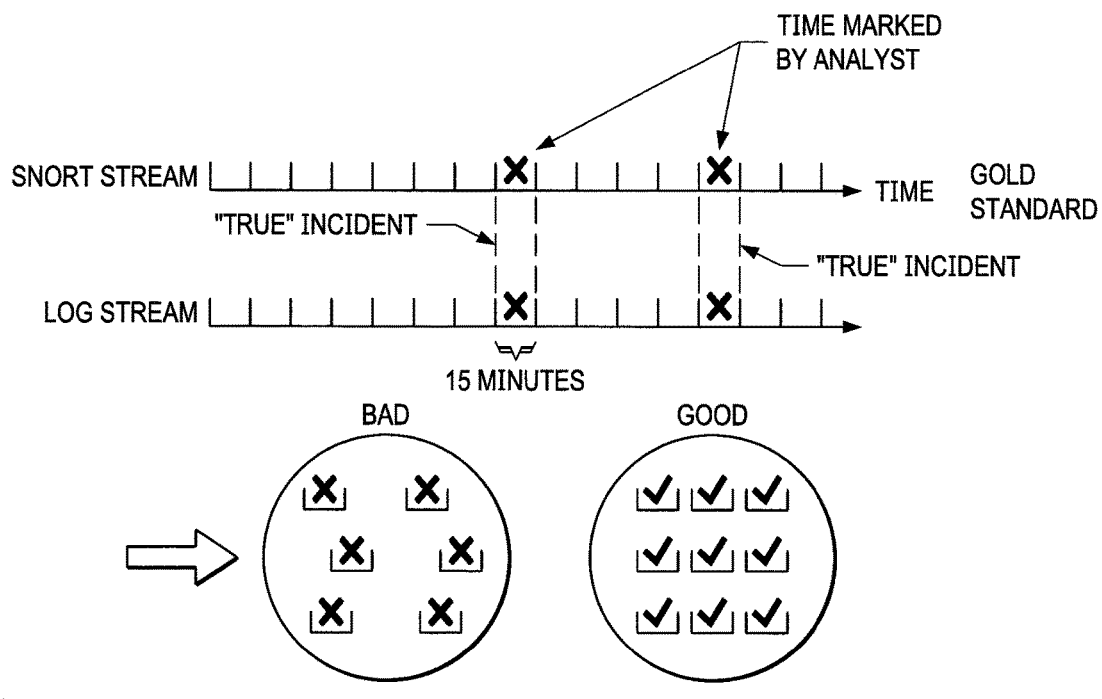
FIG. 3 illustrates Snort event stream by an intrusion detection system and incident tagging according to some embodiments disclosed herein.

As illustrated in FIG. 3, events associated with an attack (e.g., in the R phase) may be hours, days, or weeks apart. An IDS residing on a network may detect certain events in a Snort stream and send out security alerts on potential security incidents for review by human network security analysts. A human network security analyst may make a decision on the content of a security incident where a series of Snort events are presented and mark it a "true" incident. The identified "true" incident is then escalated to an operator of the network. In some embodiments, such incidents can be considered in units of 15 minutes each. The start time and the end time of each 15-minute time unit (also referred to herein as a time segment) are stored for subsequent log-mapping. This is referred to as Snort incident tagging (405) in FIG. 4. The 15-minute time unit is configurable. Other lengths of time may also be used for incident tagging purposes.

Figure 4:
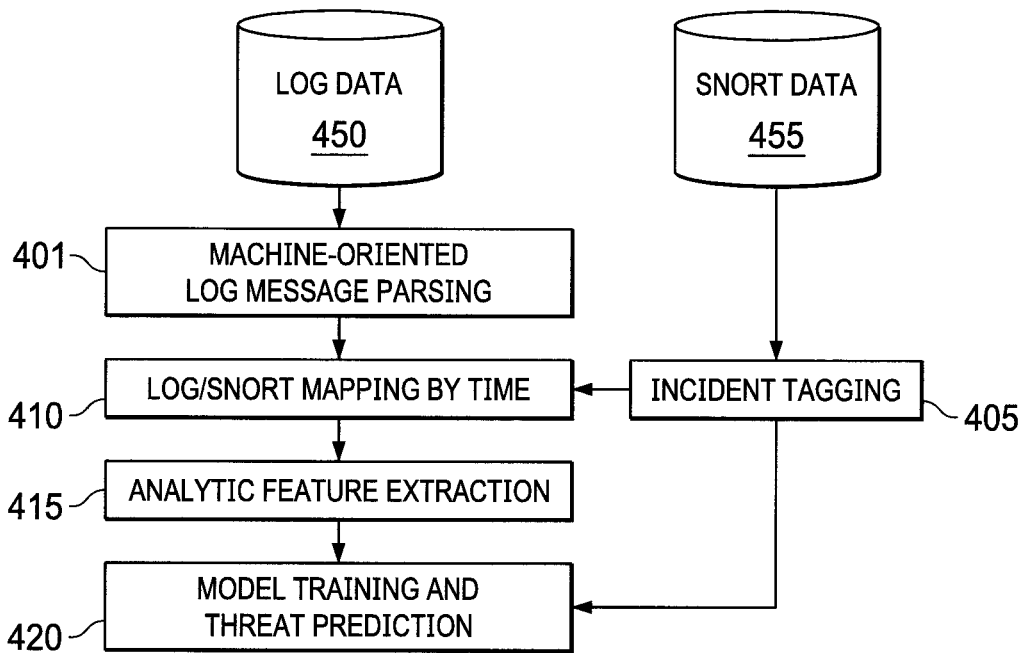
FIG. 4 depicts a flow diagram illustrating one example of a method for an automated log and snort synchronized threat detection according to some embodiments disclosed herein.

FIG. 4 depicts a flow diagram illustrating one example of a method for an automated log and snort synchronized threat detection. A goal here is to initially leverage "true" incidents of attacks that have been detected by an IDS (which may be biased to detect only certain types or numbers of attacks, due to the incredible amount of data that it must process on a continuing basis) in a Snort stream and verified by human network security analyst(s), correlate those attacks to possible security contexts that exist in log messages, and learn from both sources (the Snort stream and the log stream) to train an intelligent learning machine such that the machine can automatically and accurately detect and capture/prevent future attacks without needing human review/verification. Another goal is for the machine to automatically and accurately detect and capture/prevent additional attacks in the traditionally more difficult-to-detect attack phases such as the C, EV, and/or DE/P/L (which are often associated with higher risks and/or asset damages).

As discussed above, a human network security analyst may make a decision on the content of a security incident where a series of Snort events in Snort data 455 are presented (e.g., through a user interface) and mark/tag it a "true" incident (405). As illustrated in FIG. 3, outputs from Snort incident tagging (405) may comprise "bad" and "good" time segments. "Good" time segments may indicate normal network traffic, while "bad" time segments may indicate abnormal network traffic and thus should be time marked for further review. Whether a time segment is good or bad may depend on a human network security analyst's insight. To quantify this human decision, log messages may first be parsed heuristically to identify a structure of each log message.

Traditional methods of log processing require humans to write complicated parsers such that a human analyst would understand the type of the log message and what key information are present in the message. However, in order for a machine to perform threat detection, such parsers would be an over-kill since the machine would not "understand" or have any insight on most part of the extra information.

This invention implements a new methodology that does not require labor extensive human parser work. Rather, a statistical parser is applied with minor heuristic adjustment. To quantify a human decision, log messages in log data 450 can be parsed programmatically, automatically, and/or analytically to identify a structure of each log message using a machine-oriented log message parser (401).

In some embodiments, the first step is to identify a collection of "stem" words in a log message. Where such stem words may occur in the log message may depend on the structure of the log message. This location information gives a machine a view of the type of the log message under analysis.

Below is an example of a process for obtaining a collection of "stem" words in a log message:

1. Generate a descending sorted unigram count for all the log messages. This can be done by tokenizing each log message and count the number of appearances of each token. The number of appearances can then be sorted from the largest to smallest.
2. Keep only tokens with letters and optionally colons at the end —/^[a-zA-Z]+\:*$/
3. Remove tokens that are less than 3 letters—!/^.{1,2}:*$/
4. Skip a few selected/designated tokens as exemplified below:
   "Mon" "Tue" "Wed" "Thu" "Fri" "Sat" "Sun"
   "Jan" "Feb" "Mar" "Apr" "May" "Jun" "Jul" "Aug" "Sep" "Oct" "Nov" "Dec"
   "CDT" "EDT" "PDT" "PUB"
5. Keep a (first) predetermined number (e.g., 10000) of top tokens as candidate words.
6. Among all of the candidate words, keep only words that are valid English words. In some embodiments, a determination as to whether a word is a valid English word can be made by querying (e.g., via an application programming interface call) a network resource such as a network-based dictionary. An example of a network-based dictionary can be found at http://www.merriam-webster.com/dictionary/.
7. Keep a (second) predetermined number (e.g., 2000 or ⅕ of the first predetermined number) of top tokens as "stem" words.

With this list of "stem" words, apply a transformation to the log message:

1. Keep only the stem words and mark the rest of the log message (e.g., as "< >"). This results in a string referred to as a MsgType. This is the identification of the message type. The result of this step is to cluster all messages of the same type to this group.
2. Tokens that do not appear in the "stem" word list are identified as OOV (out of vocabulary). Their locations can be kept within the MsgType, for instance, in the following format:
   [MsgType]|[Location]:[OOV]

As a specific illustrative example, a type of login event may be logged as a string "FROM 1.3.7.5 TO 8.9.7.5 failed login." The stem words "from," "to," "failed," and "login" may be identified and non-stem (out of vocabulary (OOV)) words "1.3.7.5" and "8.9.7.5" may each be replaced with a placeholder such as "< >" in a transformation step. The transformed string, "FROM < >TO< >failed login," is then identified, based on stem words contained therein, as belonging to a particular message type, denoted in one embodiment as "MsgType." For example, "FROM < >TO< >failed login" may represent one exemplary login message type, while "User < >SQL login failed" may represent another one exemplary message type.

All log messages are processed this way so that outputs from machine-oriented log message parsing (401) may comprise strings of the same type clustered into a group. Following the above example, all this type of login events would have the same message type. In some embodiments, there may be 60,000 or more message types that are internal to the machine. OOV words are not thrown away. Instead, locations of OOV words are kept within the MsgType, for instance, in an exemplary format of [MsgType]|[location]:[OOV]. An IP address may be an example of an OOV word. Following the above example, the login event may be stored as "MessageType1: location 2|1.3.7.5" where "location 1" refers to "FROM" and "location 2" refers to "< >" in the string. With machine-oriented log message parsing (401), the machine can identify message types in log messages and locate OOV words. In one embodiment, these two processes (identifying message types in log messages and locating OOV words) are performed concurrently.

Note that embodiments disclosed here can perform well beyond quantifying human decisions. For example, some log-in events detected by an IDS in a 15-minute unit of a Snort stream may appear to be normal activities to human network security analysts and thus the 15-minute unit may not be marked by human network security analysts as a "bad" time segment. However, correlating activities occurring in the same time segment and subsequent log-in events in log messages may reveal a potential attack in the R phase. Embodiments disclosed herein, therefore, can detect potential attacks that may be missed and/or incorrectly identified by human network security analysts. Further, due to limited human efforts, it is foreseeable that many true threats could be missed. Taking a tireless machine-operated approach, embodiments disclosed herein could out-perform beyond human efforts.

In some embodiments, the start time and the end time recorded for each time segment can be used by a special machine with artificial intelligence (e.g., machine learning) to learn certain behaviors of potential attackers. Machine learning refers to a type of artificial intelligence that provides computers with the ability to learn without relying on human-crafted rules. A subfield of computer science, machine learning gives computers the ability to teach themselves to grow and change when exposed to new data. As an example, the recorded time marks (the start time and end time of "true" incidents identified by human network security analysts) in outputs from incident tagging (405) can be used to locate or map corresponding time segments in the log stream and the tag (e.g., "good" or "bad") associated with the recorded time marks in outputs from incident tagging (405) can be reused for each corresponding time segment found in the log stream (410).

For training and evaluating the machine learning algorithm, some non-incidents' comparative data may need to be provisioned. To do so, data from the same computer network may be used and time segments outside of the "true" incident region may be randomly sampled to produce "false" time segments. In some cases, the number of "false" time segments thus produced may be twice as large as the "true" time segments. The "false" and "true" time segments may then be shuffled into a complete data set. As an example, 90% of the data may be used as training data sets for training the machine to learn the characteristics of potential attacks and use the learned knowledge on such characteristics to predict "true" incidents. 10% of the data may be used as test data sets for testing the accuracy in such "true" incidents predictions.

With the training data prepared, a few categories of features are extracted from the data (415). As a non-limiting example, each unit of data to be examined represents a 15-minute segment. In some embodiments, for all the log messages in the time segments, at least the following different categories of features are extracted:

- the total number of messages in a time segment (which, as a non-limiting example, refers to a 15-minute time unit);
- the entropy based on the message types found in the time segment (which indicates a degree of randomness in message types in the time segment under examination);
- the total number of IP addresses appeared in the messages in the time segment;
- the entropy based on the IP addresses found in the time segment (which indicates a degree of randomness in IP addresses in the time segment under examination);
- a number (e.g., 1000) of message types and their respective counts;
- a number (e.g., 1000) of IP addresses and their respective counts; and
- a number (e.g., 1000) of entities selected according to Kullback-Leibler divergence.

Accordingly, in this non-limiting example, a total of 3004 features (four features from the first four categories and three thousand features from the latter three categories) are extracted. The number of message types extracted can be a subset of all message types. For the sake of computational efficiency, instead of considering all message types, a predetermined number (which can be 1000 in a non-limiting example) of top message types and their counts can be determined. To do so, the first step is to look at all the data as a whole and count how many times each MsgType appears. Then, perform a descend-sorting according to the count of each MsgType and select the top 1000. Next, for each segment, the machine counts how many MsgType of those 1000 MsgTypes appear and generates a Count of Message Types vector. As a non-limiting example, a Count of Message Types (CMT) vector may be generated for each time segment: CMT(1), CMT(2), . . . , CMT(1000). For a message type that does not appear in this time segment, the corresponding CMT is zero.

For IP addresses, a predetermined number (which can be 1000 in a non-limiting example) of top IP addresses and their counts can also be determined in a similar way to produce a Count of IP (CIP) vector for the time segment: CIP(1), CIP(2), CIP(1000).

Likewise, a predetermined number (which can be 1000 in a non-limiting example) of entities may be selected by each entity's Kullback-Leibler divergence from statistics computed between "good" and "bad" training group. Such statistics are based on the machine-oriented log message parser outputs (401). In mathematical statistics, Kullback-Leibler divergence, also called relative entropy, refers to a measure of how one probability distribution diverges from the other probability distribution. Kullback-Leibler divergence is known to those skilled in the art and thus is not further described here. In this case, Kullback-Leibler divergence is used to measure the distribution of OOV words in data sets with and without any "true" incident.

More specifically, the training set can be divided into a data set with identified "true" incident and a data set without any identified "true" incident. Then, with each ([MsgType], [Location]) tuple, the machine compares the distribution of those OOV words in each tuple for the two data sets and measures the statistical distance using Kullback-Leibler divergence. The machine performs a descending sort to sort these ([MsgType],[Location]) tuples according to Kullback-Leibler divergence, and keeps the top 1000 ([MsgType], [Location]) tuples. As discussed above with regard to transforming a log message with a list of "stem" words, each OOV word is mapped to its corresponding ([MsgType], [Location]) tuple. The machine then selects the OOV word which is the most significant in the each tuple. Similarly, for each time segment, the machine counts the number of ([MsgType], [Location],OOV) and generates a feature vector: CMO(1), CMO(2), . . . CMO(1000).

In summary, in the above example where 3004 features are extracted from seven categories, the feature vector thus generated can have 3004 dimensions which define the vector space.

In some embodiments, the vector output from analytic feature extraction (415) is provided as an input to model training and threat prediction (420). As discussed above, in some embodiments, training and testing can be done using a partitioned training data set. With a partitioned training data set, a statistical model can be trained with the extracted feature sets. More specifically, in some embodiments, a statistical model such as a boosted decision tree algorithm is used to predict, based on the extracted features associated with a time segment (which is correlated and synchronized from a log stream and a Snort stream), whether the particular time segment is "good" or "bad." Other decision tree models can also be used. In some embodiments, the prediction accuracy achieved 90-95% on the test data sets with cross-validation. As a non-limiting example, cross validation can be achieved by rotating the training sets and tests. For instance, data may be divided into 10 slices, each time using 9 slices as the training sets and 1 as the test set and enumerating all combinations and averaging the test results.

Figure 5:
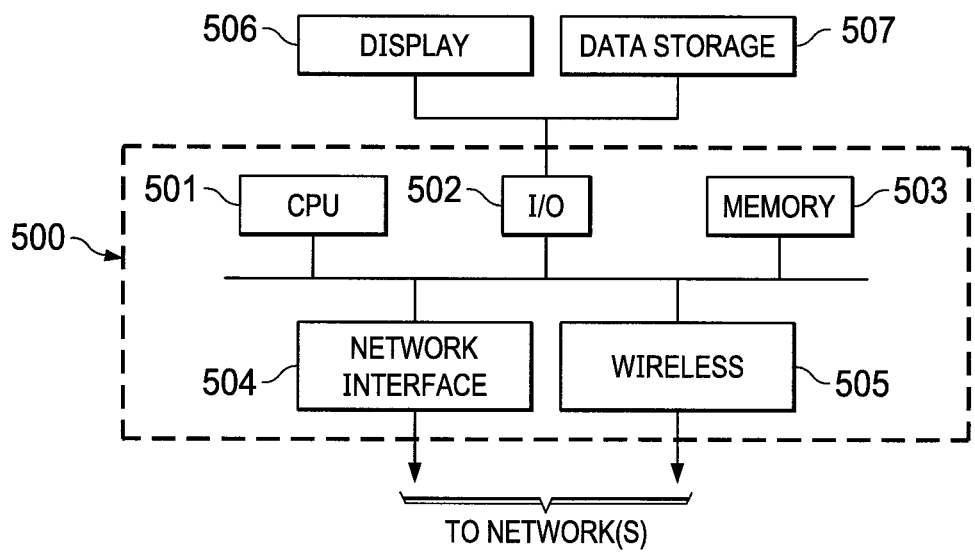
FIG. 5 depicts a diagrammatic representation of one example of a data processing system for implementing embodiments disclosed herein.

FIG. 5 depicts a diagrammatic representation of one example embodiment of a data processing system that can be used to implement embodiments disclosed herein. As shown in FIG. 5, data processing system 500 may include one or more central processing units (CPU) or processors 501 coupled to one or more user input/output (I/O) devices 502 and memory devices 503. Examples of I/O devices 502 may include, but are not limited to, keyboards, displays, monitors, touch screens, printers, electronic pointing devices such as mice, trackballs, styluses, touch pads, or the like. Examples of memory devices 503 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 500 can be coupled to display 506, information device 507 and various peripheral devices (not shown), such as printers, plotters, speakers, etc. through I/O devices 502. Data processing system 500 may also be coupled to external computers or other devices through network interface 504, wireless transceiver 505, or other means that is coupled to a network such as a local area network (LAN), wide area network (WAN), or the Internet. The servers and user devices described above may each be a data processing system that is the same as or similar to data processing system 500. Additionally, functional components necessary to implement embodiments disclosed herein may reside on one or more data processing systems that are the same as or similar to data processing system 500. Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features, and functions in order to provide a person of ordinary skill in the art context to understand the invention without limiting the invention to any particularly described embodiment, feature, or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment," or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components and mechanisms may be used. The functions of the invention can be achieved in many ways. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise. Accordingly, the scope of the invention should be determined by the following claims and their legal equivalents.

What is claimed is:

1. A method for automated threat detection in a computer network, the method comprising:
   temporally correlating time segments parsed from a log stream and tagged time segments from an intrusion detection system stream to identify correlated time segments, the correlating performed by a server computer configured for monitoring network traffic to and from the computer network;

extracting features from a correlated time segment identified from the correlating, the extracting performed by the server computer and comprising determining tuples associated with the correlated time segment, each tuple containing a message type, a location, and an out of vocabulary word in the correlated time segment;

generating a multidimensional feature vector for the correlated time segment, the multidimensional feature vector containing a select number of the tuples; and providing the multidimensional feature vector for the correlated time segment as input to a machine learning module, the machine learning module implementing a machine learning model and operable to determine, based on the machine learning model, whether the correlated time segment indicates a true incident.

2. The method according to claim 1, further comprising:
building a data set utilizing a combination of true time segments and false time segments, the true time segments containing events in the intrusion detection system stream that have been identified by human intelligence as true incidents, the false time segments produced by randomly sampling time segments outside of the true time segments;
dividing the data set into a training data set and a test data set;
training the machine learning model to learn characteristics of potential attacks using the training data set and to generate true incident predictions based on the characteristics of potential attacks; and
testing and tuning accuracy of the true incident predictions generated by the machine learning model using the test data set.

3. The method according to claim 1, further comprising:
parsing the log stream by:
identifying stem words in a log message in the log stream; and
applying a transformation to the stem words in the log message to produce an identification of a message type for the log message.

4. The method according to claim 3, further comprising:
tokenizing the log message to produce a set of tokens;
determining how many times each token appears in the set of tokens;
sorting tokens in the set of tokens by how many times each token appears in the set of tokens;
keeping only tokens with letters in the set of tokens;
removing tokens with less than three letters from the set of tokens;
removing designated tokens from the set of tokens;
out of remaining tokens in the set of tokens, keeping a first predetermined number of tokens as candidate words;
among the candidate words, keeping only words that are valid English words; and
keeping a second predetermined number of tokens as the stem words.

5. The method according to claim 1, wherein the features extracted from the correlated time segment include at least:
a total number of messages in the correlated time segment;
an entropy based on message types found in the correlated time segment;
a total number of network addresses appeared in the messages in the correlated time segment;
an entropy based on the network addresses found in the correlated time segment;
a number of message types and their respective counts in the correlated time segment;
a number of network addresses and their respective counts in the correlated time segment; and
a number of entities selected according to Kullback-Leibler divergence.

6. The method according to claim 5, wherein the entropy based on the message types found in the correlated time segment indicates a degree of randomness in the message types found in the correlated time segment and wherein the entropy based on the network addresses found in the correlated time segment indicates a degree of randomness in the network address found in the correlated time segment.

7. The method according to claim 5, wherein the number of message types and their respective counts in the correlated time segment are determined by:
determining how many times each message type appears in the correlated time segment;
performing a descend-sorting based on a count of each message type appears in the correlated time segment to produce a descend-sorted list of message types; and
selecting a set of message types from the descend-sorted list of message types, the set of message types representing a subset of all message types in the correlated time segment.

8. A system for automated threat detection in a computer network, the system comprising:
a processor;
a non-transitory computer-readable medium; and
stored instructions translatable by the processor for:
temporally correlating time segments parsed from a log stream and tagged time segments from an intrusion detection system stream to identify correlated time segments;
extracting features from a correlated time segment identified from the correlating, the extracting comprising determining tuples associated with the correlated time segment, each tuple containing a message type, a location, and an out of vocabulary word in the correlated time segment;
generating a multidimensional feature vector for the correlated time segment, the multidimensional feature vector containing a select number of the tuples; and
providing the multidimensional feature vector for the correlated time segment as input to a machine learning module, the machine learning module implementing a machine learning model and operable to determine, based on the machine learning model, whether the correlated time segment indicates a true incident.

9. The system of claim 8, wherein the stored instructions are further translatable by the processor for:
building a data set utilizing a combination of true time segments and false time segments, the true time segments containing events in the intrusion detection system stream that have been identified by human intelligence as true incidents, the false time segments produced by randomly sampling time segments outside of the true time segments;
dividing the data set into a training data set and a test data set;
training the machine learning model to learn characteristics of potential attacks using the training data set and to generate true incident predictions based on the characteristics of potential attacks; and
testing and tuning accuracy of the true incident predictions generated by the machine learning model using the test data set.

10. The system of claim 8, wherein the stored instructions are further translatable by the processor for:
parsing the log stream by:
identifying stem words in a log message in the log stream; and
applying a transformation to the stem words in the log message to produce an identification of a message type for the log message.

11. The system of claim 10, wherein the stored instructions are further translatable by the processor for:
tokenizing the log message to produce a set of tokens;
determining how many times each token appears in the set of tokens;
sorting tokens in the set of tokens by how many times each token appears in the set of tokens;
keeping only tokens with letters in the set of tokens;
removing tokens with less than three letters from the set of tokens;
removing designated tokens from the set of tokens;
out of remaining tokens in the set of tokens, keeping a first predetermined number of tokens as candidate words;
among the candidate words, keeping only words that are valid English words; and
keeping a second predetermined number of tokens as the stem words.

12. The system of claim 8, wherein the features extracted from the correlated time segment include at least:
a total number of messages in the correlated time segment;
an entropy based on message types found in the correlated time segment;
a total number of network addresses appeared in the messages in the correlated time segment;
an entropy based on the network addresses found in the correlated time segment;
a number of message types and their respective counts in the correlated time segment;
a number of network addresses and their respective counts in the correlated time segment; and
a number of entities selected according to Kullback-Leibler divergence.

13. The system of claim 12, wherein the entropy based on the message types found in the correlated time segment indicates a degree of randomness in the message types found in the correlated time segment and wherein the entropy based on the network addresses found in the correlated time segment indicates a degree of randomness in the network address found in the correlated time segment.

14. The system of claim 12, wherein the number of message types and their respective counts in the correlated time segment are determined by:
determining how many times each message type appears in the correlated time segment;
performing a descend-sorting based on a count of each message type appears in the correlated time segment to produce a descend-sorted list of message types; and
selecting a set of message types from the descend-sorted list of message types, the set of message types representing a subset of all message types in the correlated time segment.

15. A computer program product for automated threat detection in a computer network, the computer program product comprising a non-transitory computer-readable medium storing instructions translatable by a processor for:
temporally correlating time segments parsed from a log stream and tagged time segments from an intrusion detection system stream to identify correlated time segments;
extracting features from a correlated time segment identified from the correlating, the extracting comprising determining tuples associated with the correlated time segment, each tuple containing a message type, a location, and an out of vocabulary word in the correlated time segment;
generating a multidimensional feature vector for the correlated time segment, the multidimensional feature vector containing a select number of the tuples; and
providing the multidimensional feature vector for the correlated time segment as input to a machine learning module, the machine learning module implementing a machine learning model and operable to determine, based on the machine learning model, whether the correlated time segment indicates a true incident.

16. The computer program product of claim 15, wherein the stored instructions are further translatable by the processor for:
building a data set utilizing a combination of true time segments and false time segments, the true time segments containing events in the intrusion detection system stream that have been identified by human intelligence as true incidents, the false time segments produced by randomly sampling time segments outside of the true time segments;
dividing the data set into a training data set and a test data set;
training the machine learning model to learn characteristics of potential attacks using the training data set and to generate true incident predictions based on the characteristics of potential attacks; and
testing and tuning accuracy of the true incident predictions generated by the machine learning model using the test data set.

17. The computer program product of claim 15, wherein the stored instructions are further translatable by the processor for:
parsing the log stream by:
identifying stem words in a log message in the log stream; and
applying a transformation to the stem words in the log message to produce an identification of a message type for the log message.

18. The computer program product of claim 17, wherein the stored instructions are further translatable by the processor for:
tokenizing the log message to produce a set of tokens;
determining how many times each token appears in the set of tokens;
sorting tokens in the set of tokens by how many times each token appears in the set of tokens;
keeping only tokens with letters in the set of tokens;
removing tokens with less than three letters from the set of tokens;
removing designated tokens from the set of tokens;
out of remaining tokens in the set of tokens, keeping a first predetermined number of tokens as candidate words;
among the candidate words, keeping only words that are valid English words; and
keeping a second predetermined number of tokens as the stem words.

19. The computer program product of claim 15, wherein the features extracted from the correlated time segment include at least:
- a total number of messages in the correlated time segment;
- an entropy based on message types found in the correlated time segment;
- a total number of network addresses appeared in the messages in the correlated time segment;
- an entropy based on the network addresses found in the correlated time segment;
- a number of message types and their respective counts in the correlated time segment;
- a number of network addresses and their respective counts in the correlated time segment; and
- a number of entities selected according to Kullback-Leibler divergence.

20. The computer program product of claim 19, wherein the entropy based on the message types found in the correlated time segment indicates a degree of randomness in the message types found in the correlated time segment and wherein the entropy based on the network addresses found in the correlated time segment indicates a degree of randomness in the network address found in the correlated time segment.

21. The computer program product of claim 19, wherein the number of message types and their respective counts in the correlated time segment are determined by:
- determining how many times each message type appears in the correlated time segment;
- performing a descend-sorting based on a count of each message type appears in the correlated time segment to produce a descend-sorted list of message types; and
- selecting a set of message types from the descend-sorted list of message types, the set of message types representing a subset of all message types in the correlated time segment.

\* \* \* \* \*